United States Patent Office 3,293,638
Patented Dec. 20, 1966

3,293,638
ARRANGEMENT FOR CONVERTING AN
INFORMATION SIGNAL
Johan Cornelis Balder and Cornelis Kramer, both of Emmasingel, Eindhoven, Netherlands, assignors to North American Philips Company, Inc., New York, N.Y., a corporation of Delaware
Filed Feb. 18, 1964, Ser. No. 345,790
Claims priority, application Netherlands, Feb. 21, 1963, 289,316
9 Claims. (Cl. 340—347)

The invention relates to an arrangement for converting an information signal, particularly a measuring signal, into a group of pulses characteristic of the value of the information signal, which are recorded in a recording device. Such arrangements are advantageously used, for example, in checking or measuring apparatus for directly recording a measuring signal in the binary or decimal scale of notation.

The invention has for its object to provide an arrangement of the type indicated in the preamble which is distinguished by a simple structure, accuracy in recording and a substantial limitation of the dependence upon the properties of the elements used.

The arrangement in accordance with the invention is characterized in that it comprises a pulse modulator acting as a switch and a pulse generator connected thereto, the output pulses of the pulse modulator being applied to the cascade arrangement of a low-pass filter and a subtraction device, while to this subtraction device is also applied the information signal in order to obtain a difference signal which controls the pulse modulator acting as a switch, which arrangement is further provided with a recording device in the form of a counting device and a start-stop circuit which upon starting connects the counting device to the output circuit of the pulse modulator and automatically breaks the connection between the counting device and the output circuit of the pulse modulator after a predetermined number of pulses of the pulse generator reckoned from the starting instant.

It should be noted that the pulse modulator acting as a switch may supply pulses of one polarity or of opposite polarities.

In order that the invention may be readily carried into effect, it will now be described more fully with reference to the accompanying drawing, in which:

FIG. 3 shows a current-voltage characteristic curve illustrating the arrangement of FIG. 2; while

Figure 1:
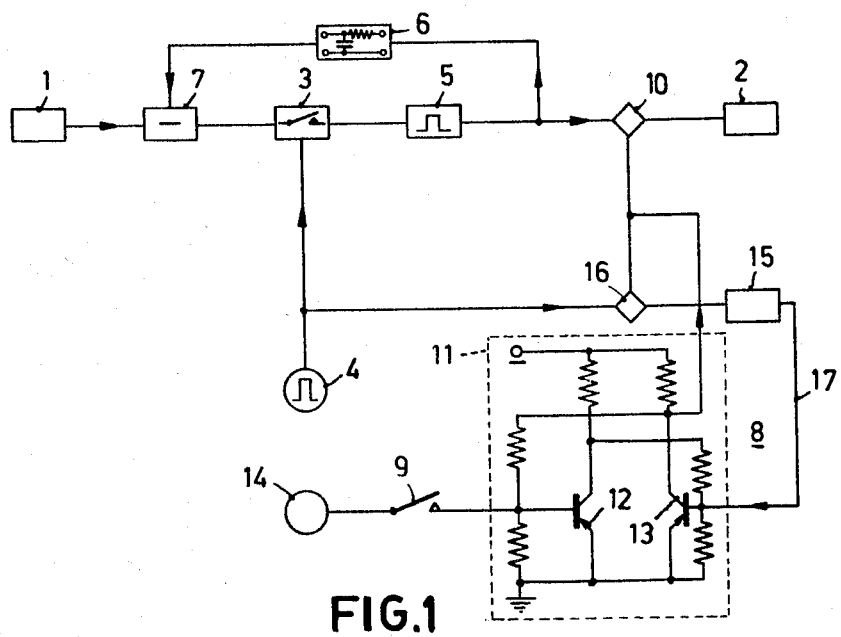
FIG. 1 shows a block diagram of an arrangement in accordance with the invention.

The arrangement in accordance with the invention shown in FIG. 1 is designed for converting a measuring signal from a measuring generator 1 in the bandwidth of from 0 to 2 c./s. into a group of pulses characteristic of the value of the measuring signal, which group is recorded in a recording device. For this purpose, the arrangement comprises a pulse modulator 3 acting as a switching device and a pulse generator 4 connected thereto for producing pulses having a repetition frequency of 25 kc./s.; it further comprises a pulse regenerator 5, a low-pass filter 6 connected to the output circuit of the pulse regenerator 5 and followed by a subtraction device 7 connected to the pulse modulator 3. The low-pass filter consists of a series resistor and a parallel capacitor and has a cut-off frequency higher than the highest signal frequency to be transmitted, but lower than the pulse repetition frequency; for example, the cut-off frequency of the low-pass filter 6 is 200 c./s.

Together with the output voltage of the low-pass filter 6, the measuring signal is supplied to the subtraction device 7 in order to produce a difference voltage which controls the pulse modulator 3 acting as a switching device in a manner such that, in accordance with the polarity of the difference signal, the pulses of the pulse generator supplied to the pulse modulator 3 are either passed or suppressed. In the embodiment shown, for example, the pulse modulator is brought into the pass condition by a positive difference signal, the pulses passed being applied to the pulse regenerator 5 for further processing, whereas with a negative difference signal the pulse modulator 3 is cut-off and no pulses are passed.

For the recording of the value of the measuring signal, the arrangement shown comprises, in addition to the recording device 2 in the form of a recording counter of the decimal type, a start-stop circuit 8 having an operating switch 9 which, when operated, connects the recording counter 2 to the pulse regenerator 5 as a result of the opening of a gate 10 and breaks the connection between the recording counter 2 and the output circuit of the pulse regenerator 5 as a result of the blocking of the gate 10 after a fixed number of pulses of the pulse generator 4 from the starting instant, the opening and the blocking of the gate 10 being effected by means of a bistable trigger arrangement 11. The bistable trigger arrangement 11 comprises two cross-connected transistors 12, 13, the collector circuit of each of the transistors 12, 13 being directly connected to the base electrode of each of the transistors 13, 12. Through the operating switch 9, the base electrode of transistor 12 is connected to a control voltage source 14 which, when the operating switch 9 is operated, applies a positive pulse to the base and thus causes the bistable trigger arrangement 11 to change from the rest condition to the working condition, the transistor 13 then being conducting and the transistor 12 being cut-off.

In order to ensure that the gate 10 is blocked after a given number of pulses of the pulse generator 4, the arrangement shown is also provided with an auxiliary counter 15 of the decimal type which is connected through a gate 16 controlled by the bistable trigger arrangement 11 to the pulse generator 4 and which supplies a stopping voltage for the bistable trigger arrangement 11 after a fixed number of pulses of the pulse generator 4. In the embodiment shown, after $10^4$ pulses of the pulse generator 4 the auxiliary counter 15 delivers an output pulse of positive polarity which is supplied through a lead 17 to the base electrode of the transistor 13 and which consequently causes the bistable trigger arrangement 11 to change from the working condition to the rest condition, the transistor 12 then being conducting and the transistor 13 being cut-off.

Consequently, if in the arrangement shown the operating switch 9 is closed, the two gates 10, 16 are opened simultaneously as a result of the change-over of the bistable trigger arrangement 11 from the rest condition to the working condition and the pulses of the pulse modulator 3 and the pulse generator 4 are supplied to the recording counter 10 and the auxiliary counter 15, respectively, the stopping voltage of the auxiliary counter 15 causing the bistable trigger arrangement 11 to change over to the rest condition again after $10^4$ pulses of the pulse generator 4, as a result of which the two gates 10, 16 are blocked again. As will be further explained hereinafter, the value of the measuring voltage is recorded in the recording counter 2 according to the decimal scale of notation.

If a measuring signal is supplied to the recording device shown, the pulse modulator 3 will be rendered conductive and cut-off in an alternation dependent upon the value of the measuring signal, and the pulses passed by the pulse modulator 3 will be applied through the pulse regenerator 5 to the low-pass filter 6, while as a result of smoothing a direct voltage is produced which is directly proportional to the number of pulses supplied to the low-pass filter 6 per unit of time. If the measuring signal is greater than the output voltage of low-pass filter 6 so that the difference voltage has a positive polarity, the pulse modulator 3 passes the pulses from the pulse generator 4 and these pulses cause an increase in the output voltage of the low-pass filter 6, whereas in the case of measuring signal smaller than the output voltage of the low-pass filter 6, the pulse modulator 3 is cut-off by the resulting difference voltage and does not pass pulses, as a result of which the output voltage of the low-pass filter 6 decreases.

Consequently, the arrangement shown tends to render the value of the output voltage of the low-pass filter 6 equal to that of the measuring signal, since even the slightest difference between these two values due to the pulse modulator 3 being rendered conductive or cut-off for the pulses of the pulse generator 4 applied thereto causes a correction of the instantaneous deviation. In this manner, it is achieved that the number of output pulses per unit of time is very accurately characteristic of the value of the measuring signal: in particular, the obtained tolerance is about $1/10^3$ or less.

In order to record the value of the measuring signal, the pulses derived from the pulse modulator 3 are applied through the pulse regenerator 5 to the recording counter 2 which to this end, upon operation of the switch 9 in the manner described above, is connected to the output circuit of the pulse regenerator 5 during $10^4$ pulses of the pulse generator 4. As a result of the fact that the number of pulses of the pulse modulator 3 per unit of time is accurately proportional to the value of the measuring signal, the value of the measuring signal is directly recorded by the recording counter 2 in a decimal scale of notation. If it is assumed, for example, that $10^4$ pulses in the recording counter 22 correspond to a value of the measuring signal of V volts, one pulse corresponds to $$\frac{V}{10^4} \text{ volts}$$

and in the case of N pulses the value of the measuring signal is $$N\frac{V}{10^4} \text{ volts}$$

In a practical embodiment in which $10^4$ pulses correspond to 10 volts and the recording counter records 5,876 pulses, the value of the measuring signal is 5.876 volts correct to two decimal places.

The recording apparatus shown is not only distinguished by a simple construction and a high degree of accuracy, but also by its extreme independence of the circuit elements used, if it is only ensured that the content of the pulses supplied by the pulse regenerator 5 satisfies the required accuracy, since the circuit between the output and the input of the pulse modulator acts as a negative-feedback circuit. All these advantages render the apparatus described very suitable for practical use.

Instead of using decimal counters for the recording counter 2 and the auxiliary counter 15, use may also be made of binary counters, the value of the measuring signal being recorded in the binary scale of notation. Such binary counting devices may be advantageously used, for example, in electronic computers.

It should be noted that in the arrangement shown the sequence of the low-pass filter 6 and the subtraction device 7 may be reversed without any objection.

Figure 2:
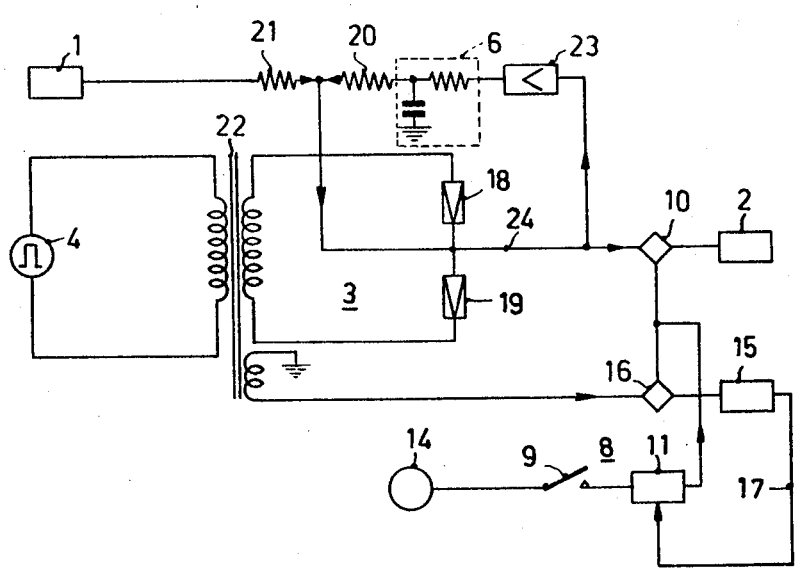
FIG. 2 shows an embodiment of an arrangement in accordance with the invention.

FIG. 2 shows a variant of the arrangement of FIG. 1, in which corresponding elements are denoted by the same reference numerals.

Figure 3:
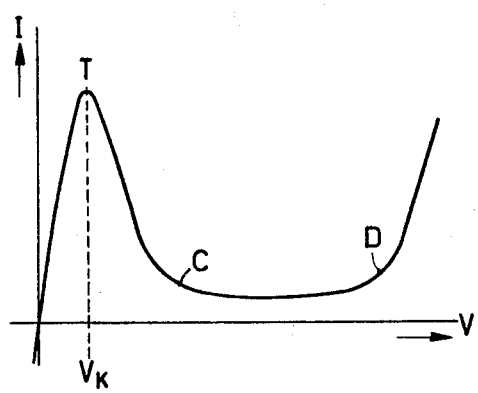

In order to obtain a particularly simple and sensitive pulse modulator, use is made in this arrangement of two bipolar elements in the form of two tunnel diodes 18, 19 which, as appears from the current-voltage characteristic curve shown in FIG. 3, exhibit a negative resistance value when a given critical voltage value $V_k$ is exceeded. The unlike electrodes of the tunnel diodes 18, 19 are connected to each other while through resistors 20, 21 resp. the low-pass filter 6 and the measuring signal generator 1 are connected to this junction point, the pulses of the pulse generator 4 being applied through a transformer 22 to the other unlike electrodes, which pulses each time shift the adjustment of the two tunnel diodes, 18, 19, in the direction of their negative-resistance values. The output pulses of the pulse modulator are derived from the junction point of the tunnel diodes 18, which pulses are applied through a pulse amplifier 23 for further processing to the low-pass filter 6, while the recording counter 2 is also connected through the gate 10 to the junction point of the tunnel diodes 18, 19.

In a manner quite identical with that already described with reference to FIG. 1, the pulses from the pulse generator 4 will be either passed or suppressed according to the polarity of the difference signal which is constituted in the arrangement shown by the difference between the currents flowing across the resistors 21, 22. If, for example, at a given instant the tunnel diode 19 is biassed in the pass direction as a result of instantaneous difference signal while the tunnel diode 18 is biassed in the blocking direction, a pulse applied through transformer 22 to the tunnel diodes 18, 19 will result in that the tunnel diode 19 is adjusted beyond the peak T of the current-voltage characteristic curve, particularly in the level region CD of its current-voltage characteristic curve, while the tunnel diode 18 is adjusted in the region before the peak T. Hence, when a pulse is applied by the pulse generator 4, which, as already stated above, simultaneously shifts the adjusting points of the two tunnel diodes 18, 19 in the direction of the negative-resistance characteristic curves, the adjustment of the tunnel diode 19 will first follow its current-voltage characteristic curve, as a result of its preadjustment in the pass direction towards lower current values, and the tunnel diode 18 will be locked at a point in the region of the peak T.

The two tunnel diodes 18, 19 together constitute a voltage divider across the transformer 22, while the resistance of the tunnel diode 19 determined by the quotient of the voltage and current values associated with its adjusting point in the level adjusting region CD is higher by one order than the resistance of the tunnel diode 18 determined by the quotient of the voltage and current values associated with its adjusting point for the critical value $V_k$, so that the pulse supplied to the transformer 22 is passed through the very low resistance of the tunnel diode 18 to the output lead 24. Conversely, if the tunnel diode 18 is biassed in the pass direction and the tunnel diode 19 is biassed in the blocking direction, no pulse will be passed to the low-pass filter 6.

In a manner quite analogous to that already described with reference to FIG. 1, the output pulses of the pulse modulator 3 tend to adjust the difference signal to zero after amplification and polarity reversal in the pulse amplifier 23 through the smoothing filter 6, the number of pulses derived from the pulse modulator 3 per unit of time being accurately proportional to the value of the measuring signal. In this arrangement, recording is also effected in the same manner as in the case of FIG. 1, that is to say, the output pulses of the pulse modulator upon operation of the switch 9 are supplied to the recording counter 2 during $10^4$ pulses of the pulse generator 4.

In comparison with the arrangement shown in FIG. 1, the arrangement just described is distinguished by a great sensitivity—for example, differences of 2 μa. in the difference signal are still sensed—and also by its particular simplicity; it has been found that in this arrangement, a pulse regenerator can be dispensed with, since distortions in the output pulses of the pulse modulator 3 are greatly limited. In the arrangement shown, the pulse modulator 3 at the same time acts as a pulse regenerator.

Figure 4:
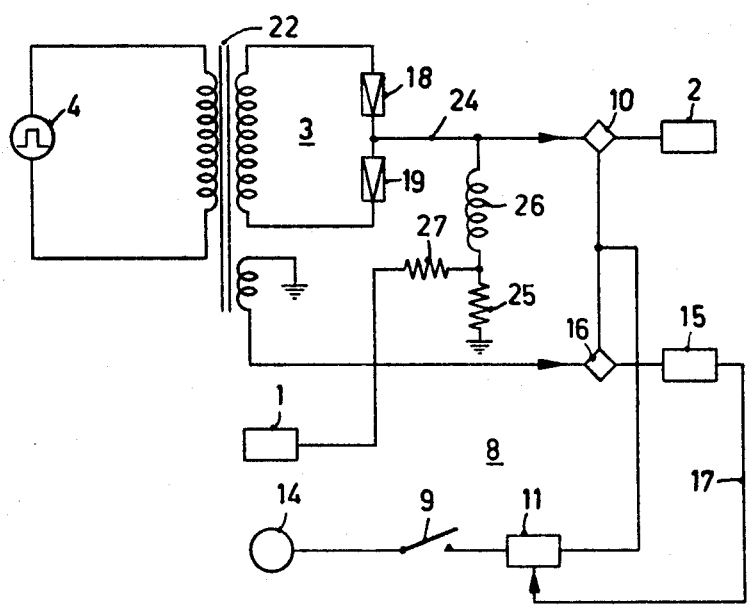
FIG. 4 shows a particularly simple arrangement in accordance with the invention.

A further simplification of the arrangement in accordance with the invention is shown in FIG. 4.

In FIG. 4, elements corresponding to those of FIG. 2 are denoted by the same reference numerals.

As has been illustrated with reference to FIG. 2, in order to produce the difference signal the pulses derived from the pulse modulator 3 are supplied through an amplifier 23 acting as a phase inverter stage to a low-pass filter 6 constituted by a quadripole. Both functions, that is to say, the phase inverting and the smoothing, are performed in the arrangement shown in FIG. 4 by a smoothing filter connected to the junction point of the tunnel diodes 18, 19, which filter consists of the series combination of a resistor 25 and a coil 26.

Pulses occurring at the junction point of the tunnel diodes 18, 19 are applied to the series combination of the resistor 25 and the coil 26 in order to be smoothed, the oppositely directed electromotive force produced upon smoothing of the pulses in the coil 26 causing a current to flow which, together with the signal current supplied through the series resistor 27, provides the desired difference signal. In the embodiment shown, the measuring signal is applied through the series resistor 27 to the junction point of the coil 26 and the resistor 25.

The operation of the arrangement shown is analogous to that described in FIG. 3, the pulses produced at the junction point of the tunnel diodes 18, 19 being accurately proportional to the value of the measuring signal, while recording is effected in the same manner as described in FIGS. 1 and 3.

The following data are given of an arrangement extensively tested in practice.

Tunnel diodes 18, 19 _____ Germanium tunnel diodes having a peak current of 5 ma.
Resistor 25 _____ 120Ω.
Coil 26 _____ 100 mh.
Resistor 27 _____ 1KΩ.

It should be noted that instead of tunnel diodes, other two-pole elements having a negative resistance characteristic curve may be used, for example, p-n-p-n diodes. It is further to be noted that in the arrangements shown, the manually operated switch 9 of the start-stop circuit 8 may be replaced by electronically controlled switches, for example, for the automatic recording of measuring signals.

What is claimed is:

1. An arrangement for converting an information signal into a group of pulses characteristic of the value of the information signal, which are recorded in a recording device, characterized in that the arrangement comprises a pulse modulator acting as a switch and a pulse generator connected thereto, the output pulses of the pulse modulator being applied to the cascade arrangement of a low-pass filter and a subtraction device, while to this subtraction device is also applied the information signal in order to obtain a difference signal which controls the pulse modulator acting as a switch, which arrangement is further provided with a recording device in the form of a counting device and a start-stop circuit which upon starting connects the counting device to the output circuit of the pulse modulator and automatically breaks the connection between the counting device and the output circuit of the pulse modulator after a predetermined number of pulses of the pulse generator reckoned from the starting instant.

2. An arrangement as claimed in claim 1, characterized in that the cut-off frequency of the low bandpass filter is higher than the highest information signal frequency but lower than the repetition frequency of the pulses of the pulse generator.

3. An arrangement as claimed in claim 1, characterized in that the arrangement is also provided with an auxiliary counter which, when the start-stop circuit is started, is connected to the pulse generator and applies a stopping voltage for the start-stop circuit after a fixed number of pulses of the pulse generator.

4. An arrangement as claimed in claim 1, characterized in that the output pulses of the pulse modulator are supplied through a pulse regenerator to the low-pass filter and also to the counting device.

5. An arrangement as claimed in claim 1, characterized in that the counting device and the auxiliary counter are each connected through a gate to the output circuit of the pulse modulator and to that of the pulse generator, respectively, and in that further, for the control of the gates, the start-stop circuit comprises a bistable trigger arrangement which, when operated by an operating switch, opens both gates and subsequently, after a predetermined number of pulses of the pulse generator, blocks both gates by means of the stopping voltage of the auxiliary counter applied to the bistable trigger arrangement.

6. An arrangement as claimed in claim 5, characterized in that the operating switch is constituted by an electronic switch.

7. An arrangement as claimed in claim 1, characterized in that the pulse modulator is constituted by two two-pole elements connected to each other and having a negative-resistance characteristic curve, the measuring signal and the output signal of the low-pass filter being applied to the electrodes of the two-pole elements connected to each other, while the pulses of the pulse generator are applied to the other electrodes of the two-pole elements, which pulses shift the adjusting points of the two two-pole elements in the direction of the negative-resistance characteristic curves while the output pulses of the pulse modulator are derived from the junction point of the two two-pole elements.

8. An arrangement as claimed in claim 7, characterized in that the output pulses derived from the junction point of the two two-pole elements are applied, through an amplifier acting as a phase-inverter stage, to the low-pass filter.

9. An arrangement as claimed in claim 7, characterized in that the low-pass filter consists of the series combination of a coil and a resistor, which series-combination is connected to the junction point of the two-pole elements.

References Cited by the Examiner

UNITED STATES PATENTS

| | | | |
|---|---|---|---|
| 2,966,672 | 12/1960 | Horn | 340—347 |
| 3,028,550 | 3/1962 | Naydan et al. | 324—70 |
| 3,148,366 | 9/1964 | Schulz | 340—347 |

MAYNARD R. WILBUR, *Primary Examiner.*

A. L. NEWMAN, *Assistant Examiner.*